Aug. 29, 1944.   A. F. HOWE   2,357,114
SHOVEL
Filed Oct. 13, 1943
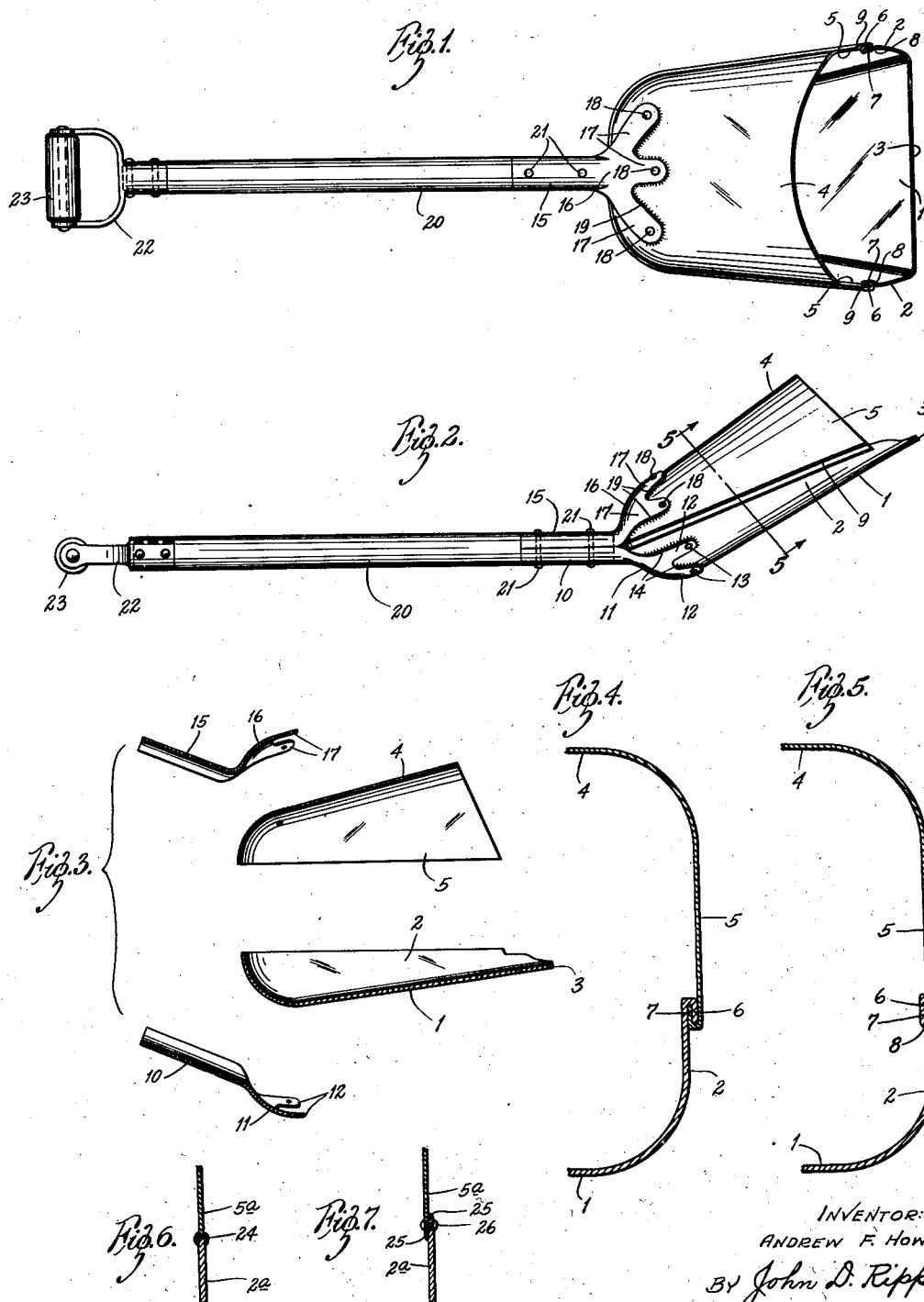
INVENTOR:
ANDREW F. HOWE,
By John D. Rippey
HIS ATTORNEY.

Patented Aug. 29, 1944

2,357,114

UNITED STATES PATENT OFFICE 2,357,114

SHOVEL

Andrew F. Howe, University City, Mo., assignor of one-third to Ralph J. Niehaus, Jennings, Mo., and one-third to William F. Niehaus, St. Louis, Mo.

Application October 13, 1943, Serial No. 506,036

4 Claims. (Cl. 294—55)

This invention relates to shovels; and has particular reference to a shovel having a closed top and rear end and an opening in its forward end adapted specially for use in stoking furnaces, etc., with solid fuel, such as coal, and for use in handling grain and other materials.

Objects of the invention are to provide a shovel that is completely enclosed with the exception of its forward end which is open for the reception and discharge of the materials to be handled thereby; to provide a shovel composed of separate lower and upper metallic sections shaped to form the bottom portion and the top portion, respectively, of the shovel; to provide novel means for attaching together the marginal edges of said sections along their sides and rear to form a shovel that is enclosed throughout with the exception of an open forward end; to provide socket elements attached to and projecting rearwardly from the rear end portions of said lower and upper sections, respectively, strengthening said attaching means by which said lower and upper sections are secured to each other, and also providing a socket for receiving and engaging a handle for manually operating the shovel.

Another object of the invention is to provide an improved metallic shovel composed of lower and upper sections having interlocked marginal edges for holding said sections in rigid connection and positively preventing any displacement thereof, in order to form an enclosed shovel having an opening only at its forward end for the reception and discharge of the materials handled thereby.

Another object of the invention is to provide novel elements cooperating with the lower and upper sections of the shovel to reinforce and strengthen said sections and to assist in preventing relative displacement thereof, and also to form a socket for receiving and engaging a handle.

Other objects will be apparent from the following description, reference being made to the annexed drawing, in which—

Fig. 1 is a top plan view of a shovel embodying the present invention.

Fig. 2 is a side elevation of the shovel.

Fig. 3 is a sectional view showing the four members forming the shovel proper and consisting of the two socket members and the lower and upper sections of the shovel.

Fig. 4 is an enlarged sectional view showing the interengaged rebent margins of the lower and upper sections of the shovel before being provided with the final interlock.

Fig. 5 is a similar sectional view showing the interlocked rebent margins after the final interlock has been effected.

Fig. 6 is a sectional view showing a modified rigid attachment of the lower and upper sections of the shovel without the use of interlocked rebent margins.

Fig. 7 is a sectional view showing the margins of the lower and upper sections overlapped and rigidly attached without the use of interlocked rebent margins.

The body of the shovel comprises a lower section and an upper section, both preferably composed of sheet metal processed and shaped, and secured together, to provide an enclosed shovel that is open only at its forward end. The lower sheet metal section may be composed of heavier or thicker stock than the upper section in order to withstand the wearing effects of abrasion to which the shovel is subjected when used, and particularly to withstand abrasion along the solid floors or surfaces. When the upper section is thinner and is formed of lighter weight stock than the lower section, it contributes to the formation of a shovel of lighter weight than if both sections of the shovel were made of the same heavier stock as the lower section. The body of the light-weight shovel is substantially strengthened by the two elements that form the handle socket and which embrace between them the rear closed end of the shovel body, are rigidly attached to the lower and upper sections, and are rigidly attached together and to the engaged end of the handle beyond the shovel body.

As shown in the drawing, the lower section of the shovel body consists of a sheet metal plate shaped to form a substantially flat bottom 1 extending nearly the full width and full length of the shovel, and an upwardly extended margin 2 which is continuous along the two sides and rear of the flat bottom 1. The lower section is thus formed with a straight-edged front 3 extending wholly or nearly the full width of the bottom 1 between the front ends of the side margin 2. The lower sheet metal section is composed of suitable sheet metal stock in order to withstand the wearing effects of abrasion when the shovel is slid along solid floors or surfaces in actual use.

The upper section of the body of the shovel consists of a sheet metal plate preferably of thinner or lighter stock and of less length than but otherwise complementary to the lower section. The upper sheet metal plate section is shaped to form a top 4, and a downwardly extended margin 5 which is continuous along the two sides and rear of said top 4. The downwardly extended margin 5 of the upper section is in continuation of the upwardly extended margin 2 of the lower section when the two are assembled and attached together to form the completed shovel.

The upper marginal edge 6 of the lower section 1—2 is bent downwardly; and the lower marginal edge 7 of the upper section 4—5 is bent upwardly, so that said marginal edges may be initially interlocked by slight distortion of the margins 2 and 5, as shown in Fig. 4. Then, the margins 2 and 5 are subjected to pressure to form thereon, respectively, curved portions 8 and 9 which press against the rebent portions 7 and 6, respectively. Thus, the curved portions 8 and 9 cooperate positively to prevent any separation of the lower and upper portions of the shovel. This interlocking attaching means may be additionally strengthened by welding or by other known expedients. The heavier and stronger lower section 1—2 of the shovel strengthens and reinforces the thinner and lighter upper section along the joint by which two are united. As clearly shown in Fig. 2, the front 3 of the lower section is forwardly beyond the end of the upper section of the shovel so as to engage in or under the fuel or other material to be handled by the shovel. When the lower and upper sections are thus united throughout the length of their edges, they provide a shovel that is closed along its two sides and rear and is open only at the front above the front edge 3 of the lower section.

A socket device for engagement with a handle is rigidly attached to the rear closed end of the shovel and to both the lower and upper sections thereof. The socket device is composed of two separate sections each comprising a rearwardly extended semi-circular or semi-tubular portion which cooperate to form a tubular socket, and a forwardly extended plate portion for attachment to the adjacent section of the shovel. As shown, the lower socket section is composed of sheet metal shaped to form a rearwardly extended semi-circular or semi-tubular portion 10 and a forwardly extended dished plate portion 11 adapted to engage and seat snugly against the rear rounded end of the lower portion 1—2 of the shovel. The forwardly extended dished plate portion 11 of the lower socket section may be cut out to form a number of extended fingers 12 to seat against said section 1—2 to which they are attached by rivets 13 and by welds 14, or either of these attaching means, or otherwise as desired. The upper section of the socket device is also composed of sheet metal shaped to form a rearwardly extended semi-circular or semi-tubular portion 15 complementary to the portion 10, and a forwardly extended dished plate portion 16 for seating against and attachment to the adjacent upper section 4—5 of the shovel body. The dished plate portion 15 may also be cut out to form a number of extended fingers 17 which may be rigidly attached to the upper section 4—5 of the shovel body by rivets 18 and welds 19, or either of these attachments, or otherwise as desired. The two rearwardly extended semi-circular and semi-tubular portions 11 and 15 may have abutting edges, in order to cooperate to form a tubular socket adapted to receive the end of a handle 20. Rivets or like fasteners 21 are extended through the socket portions 10 and 15 and through the interposed and engaged end of the handle 20 and are headed on their opposite ends to prevent displacement or removal. The rivets 21 serve the double function of holding the handle 20 engaged in the socket, and also holding the two socket members 10 and 15 in rigid cooperative relationship to prevent them from spreading apart. The socket composed of said two members 10 and 15, as well as the handle 20, incline angularly upwardly and rearwardly from the longitudinal axis of the body of the shovel so that, when the flat bottom 1 rests upon or is operated along a floor or other surface, the handle may be conveniently engaged by the hands of the user. The end of the handle is equipped with a metallic fork 22 supporting a hand-hold 23 extending transversely of the axis of the longitudinal axis of the handle 20.

Fig. 6 shows margins 2a and 5a analogous to the margins 2 and 5, and having their edges in abutting contact. That is, the lower edge of the margin 5a seats upon the edge of the margin 2a. The two margins are rigidly attached together and prevented from relative displacement by a weld 24.

Fig. 7 shows the margins 2a and 5a overlapping and rigidly attached together by a weld 25 and by rivets 26, and thereby held in rigid connection with each other and positively prevented from displacement. It should be understood that either the weld 25 or the rivets 26 may be used optionally, and that either may be omitted as desired.

Figs. 6 and 7 show only the margins of the lower and upper sheet metal sections, respectively. It should be understood that the lower section comprises a bottom like the bottom 1, and that the upper section comprises a top like the top 4 so that, when said lower and upper sections are rigidly attached together, they provide a shovel open only at its forward end and closed along its sides and rear end, as should be clear by reference to Figs. 1 and 2. Further, the socket device for the handle, which is not shown in Figs. 6 and 7, is like the socket device already described, and is composed of two separate sections attached, respectively, to the lower and upper sections of the shovel.

From the foregoing, it is evident that this invention provides a shovel that is completely enclosed, with the exception of an opening at its forward end for reception and discharge of materials to be handled. The lower and upper metallic plate sections are shaped to form bottom and top portions of the shovel and are attached together by a reinforcing and strengthening interlock along their complementary marginal edges. The socket, also composed of two sheet metal sections rigidly attached, respectively, to the lower and upper sections of the shovel, cooperates with the fasteners 21, to reinforce and strengthen said sections and positively prevent relative displacement thereof.

The invention may be varied within the scope of equivalent limits as defined by the appended claims without departure from the nature and principle thereof.

I claim:

1. A shovel comprising separate lower and upper metallic sections forming, respectively, a bottom and a top of a closed shovel body having an opening only at its forward end, integral margins having their edges adjacent to each other along the sides and rear end of said sections, means rigidly attaching together said adjacent edges and holding said lower and said upper sections rigidly connected to form a shovel open at its forward end and closed along its said sides and rear end, separate metallic lower and upper semi-tubular elements cooperating to form a tubular socket inclining upwardly and rearwardly from said attached edges, dished plate portions integral with the forward ends of said elements diverging from each other and fitting against the outer surfaces of said lower and upper sections, means rigidly attaching said dished plate portions to said lower and upper sections, respectively, below and above said attached edges, a handle extending into said socket, and fasteners preventing said socket elements and said sections from spreading apart and also attaching said handle in said socket.

2. A shovel comprising separate lower and upper metallic sections forming, respectively, a bottom and a top of a closed shovel body having an opening only at its forward end, integral overlapped rebent interlocked margins rigidly attaching and holding said sections together to form said closed shovel body having said opening at its forward end, separate metallic lower and upper semi-tubular elements cooperating to form a tubular socket inclining upwardly and rearwardly from said interlocked margins, dished plate portions integral with the forward ends of said elements diverging from each other and seating against the outer surfaces of said lower and upper sections, means rigidly attaching said dished plate portions to said lower and upper sections, respectively, below and above said interlocked margins, a handle extending into said socket, and fasteners preventing said socket elements and said sections from spreading apart and also attaching said handle in said socket.

3. A shovel comprising separate upper and lower metallic sections forming, respectively, a bottom and a top of a closed shovel body having an opening only at its forward end, integral margins having their edges abutting each other along the sides and rear of said sections, means rigidly attaching together said abutting edges and holding said lower and upper sections rigidly connected to form a shovel open at its forward end and closed along its said sides and rear end, separate metallic lower and upper semi-tubular elements cooperating to form a tubular socket inclining upwardly and rearwardly from said abutting edges, dished plate portions integral with the forward ends of said elements diverging from each other and fitting closely against the outer surfaces of said lower and upper sections below and forwardly from said abutting edges at the rear of said sections, means rigidly attaching said dished portions to said lower and upper sections below and forwardly beyond said abutting edges at the rear of said sections, a handle extending into said socket, and fasteners preventing said socket elements and said sections from spreading apart at the rear of said sections and also attaching said handle in said socket.

4. A shovel comprising separate upper and lower metallic sections forming, respectively, a bottom and a top of a closed shovel body having an opening only at its forward end, integral margins having their edges overlapping each other along the sides and rear of said sections, fasteners passing through said overlapping edges and holding said lower and said upper sections rigidly connected to form a shovel open at its forward end and closed along its sides and rear end, separate metallic lower and upper semi-tubular elements cooperating to form a tubular socket inclining upwardly and rearward from said overlapped edges, dished plate portions integral with the forward ends of said elements diverging from each other and seating closely against the outer surfaces of said lower and upper sections, means rigidly attaching said plate portions to said lower and upper sections, respectively, below and above said overlapped edges at the rear end of said shovel body, a handle extending into said socket, and fasteners preventing said socket elements and said sections from spreading apart and also attaching said handle in said socket.

ANDREW F. HOWE.